5 Sheets—Sheet 4.
J. H. STERNBERGH.
MAKING NUTS.
No. 81,224. Patented Aug. 18, 1868.
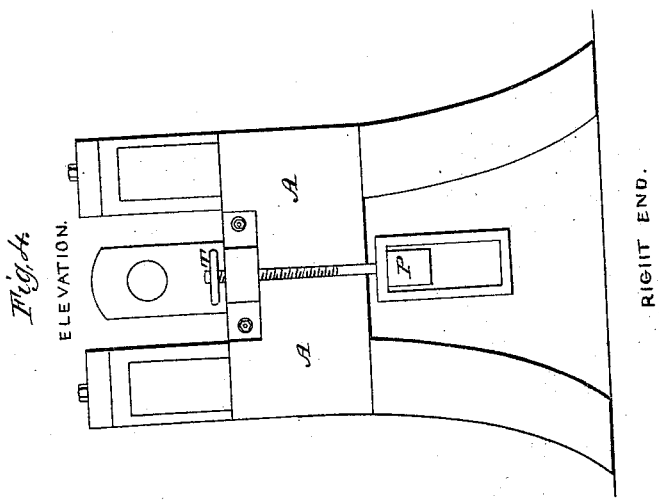
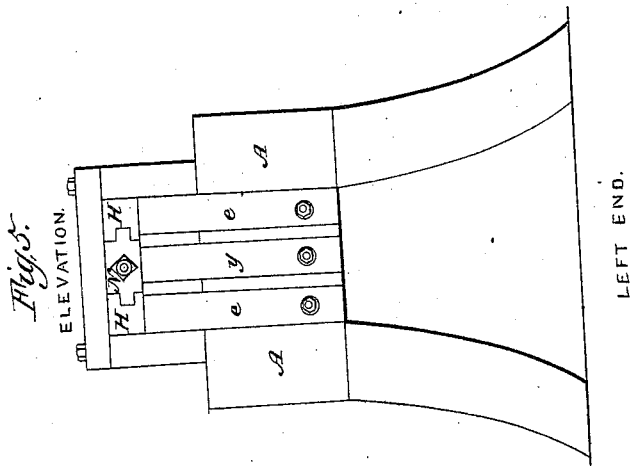
Witnesses.
S. C. Smith,
Allen Kutz.
Inventor.
J. H. Sternbergh.

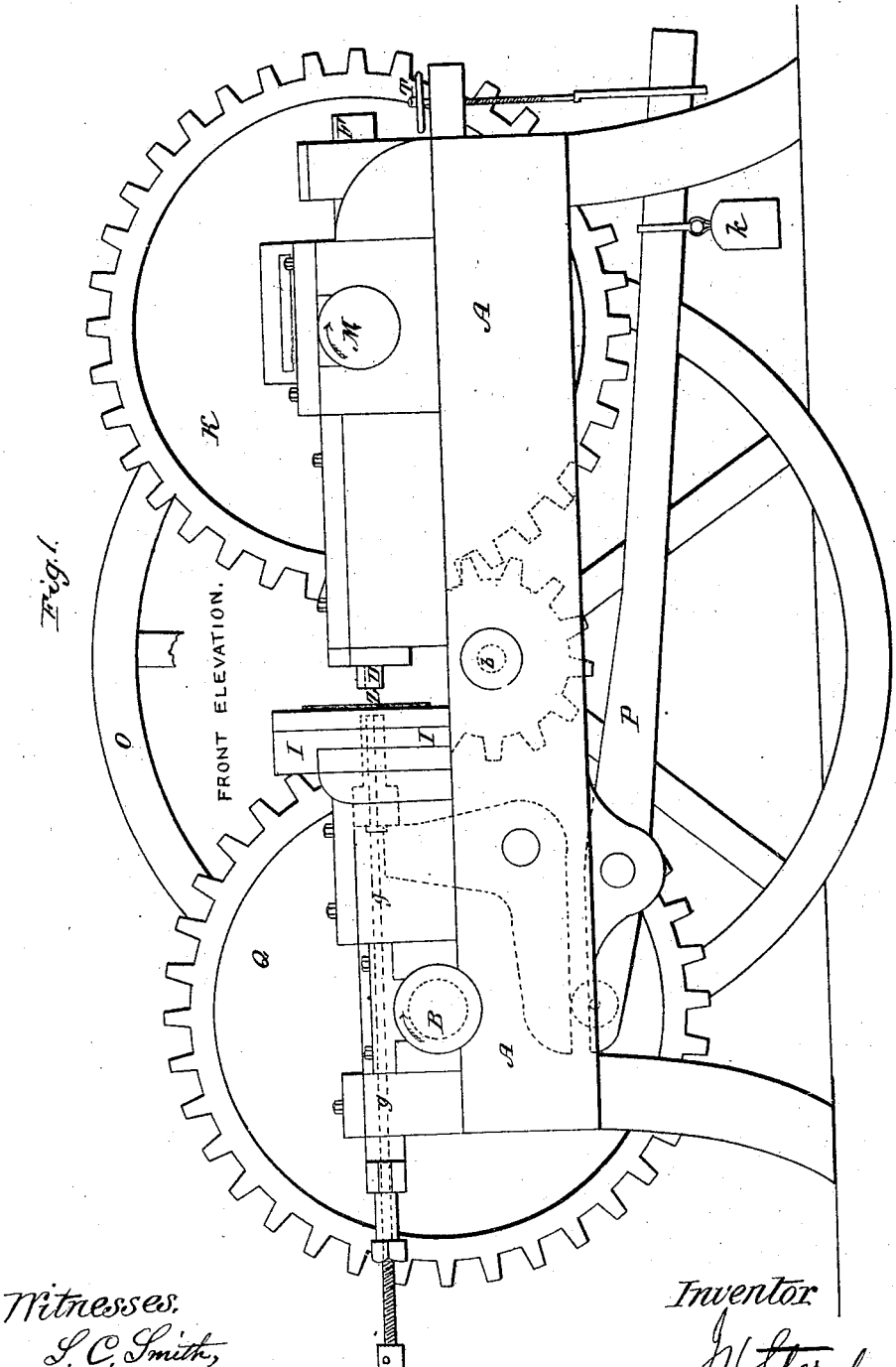

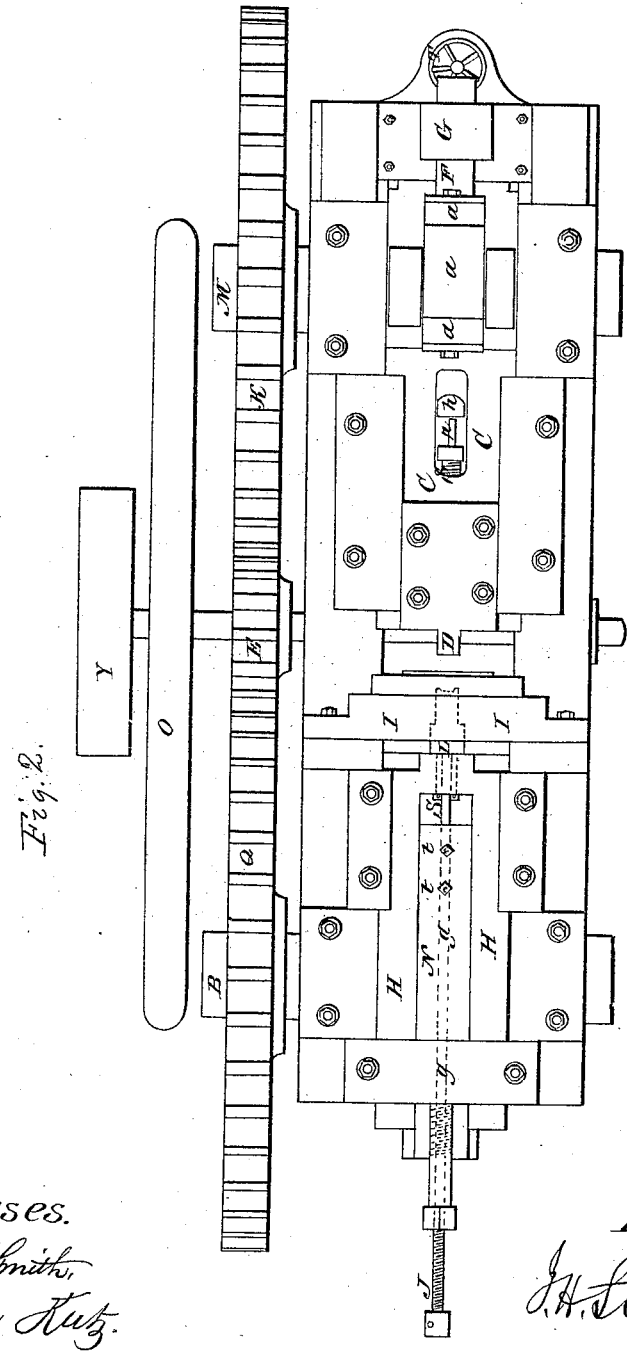

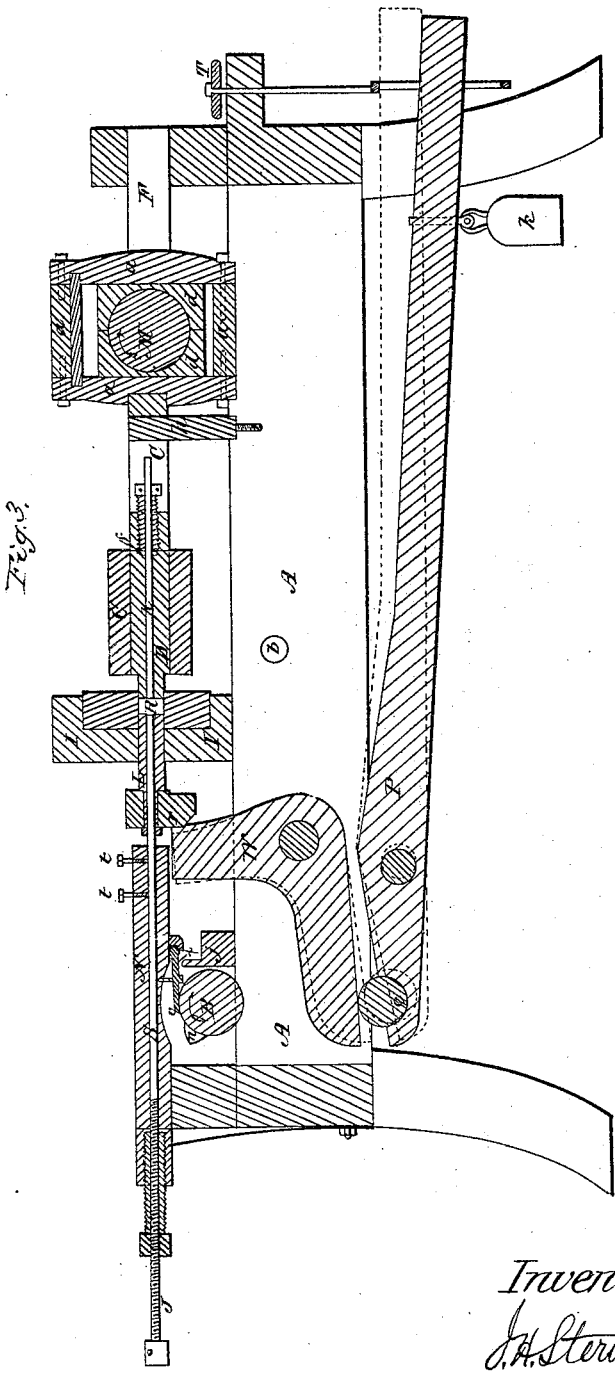

5 Sheets—Sheet 5.
J. H. STERNBERGH.
MAKING NUTS.
No. 81,224.      Patented Aug. 18, 1868.
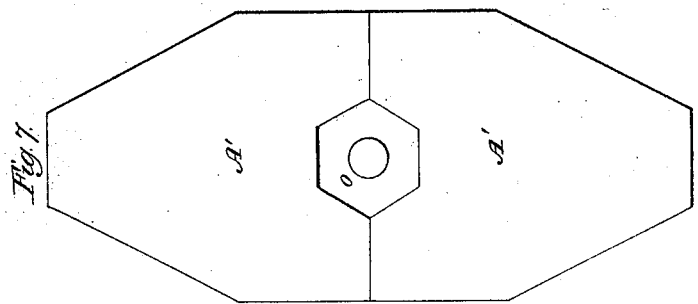
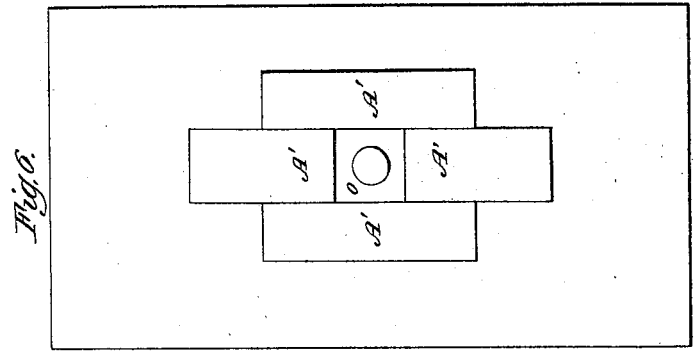
Witnesses.
S. C. Smith.
Allen Nutz.
Inventor.
J. H. Sternbergh

United States Patent Office.

JAMES HERVEY STERNBERGH, OF READING, PENNSYLVANIA.

Letters Patent No. 81,224, dated August 18, 1868.

IMPROVEMENT IN MAKING NUTS.

The Schedule referred to in these Letters Patent and making part of the same.

TO ALL WHOM IT MAY CONCERN:

Be it known that I, JAMES HERVEY STERNBERGH, of the city of Reading, county of Berks, and State of Pennsylvania, have invented a new and useful Improvement in Machinery for Making Hot-Pressed Wrought-Iron Nuts and washers for screw-bolts; and I do hereby declare that the following is a full and exact description thereof, reference being had to the accompanying drawings, and to the letters of reference marked thereon.

Figure 1 is a front elevation of the machine for making hot-pressed nuts and washers.

Figure 2 is a top plan or view of same.

Figure 3 is a sectional elevation through the centre of the machine, longitudinally, showing the nut-blank after it has been severed from the heated bar, and forced into the die-box, and about to be pressed and pierced; also showing the position of the compound lever, which sustains the pressure given the nut-blank, while in the die-box, before it is pierced.

Figures 4 and 5 are elevations of the right and left-hand ends of the machine respectively.

Figures 6 and 7 represent the arrangement of dies for forming square and hexagonal die-boxes respectively.

In the several figures, similar letters of reference denote similar parts of the machine.

The object of my invention is to produce a machine based upon an improved principle of working, for the purpose of making thick or thin wrought-iron nuts, washers, collars, &c., without material alteration in its movements, which shall be less complex than other hot-pressed nut-machines now in use, and consequently less liable to derangement, and therefore more profitable to the manufacturer, for making a steady and large product daily, than the imperfect machines heretofore in use for this purpose.

My invention also has for its object, the production of a machine having the ability to accommodate itself readily to any extra thickness of iron that may be used unintentionally, or to the careless introduction of two nuts within the die-box at the same time, without danger of breaking the machine, and at the same time to produce a well-shaped and perfect nut or washer, whether the iron be thicker or thinner than is intended to be used.

To enable others skilled in the art to make and use the machine, I will proceed to describe its construction and operation.

The frame of the machine is made of cast iron, and is represented at A A in figs. 1, 2, 3, 4, and 5.

$b$, fig. 1, is a wrought-iron shaft, upon which is secured the pinion E, which works into the toothed wheels Q and K, driving the shafts B and M in the direction of the arrows.

Upon the shaft $b$, next to the pinion, is secured the heavy fly-wheel O, and outside the fly-wheel is the pulley Y, by means of which power is transmitted to drive the shafts B and M.

The shaft M, fig. 3, has an eccentric turned upon it, fitting the boxes $d\ d$, and these boxes are secured within the frame $a\ a\ a\ a$, to which the cross-head C C is firmly attached.

F is a guide, working in the box G, fig. 2, and is intended to secure a steady and true motion to the cross-head C C.

D is the cut-off punch, made of steel, having a hole bored through it, from end to end, about the diameter of the hole to be made in the nut, and is intended for severing the blank from the end of the heated bar, and forcing it into the die-box, seen at $o$, figs. 6 and 7. The back end of this punch rests against the screw $f$, by means of which screw the punch D can be moved forward, as desired.

The screw $f$ is also bored out in line with the hole through D, and a pusher or rod of iron, $p$, lies in the hole of the punch D, and screw, $f$, intended to push out the core or piercing of the nut or washer from the forward end of the punch D as the cross-head C C is drawn back, and the end of the pusher comes in contact with the stationary stud $h$.

H H, fig. 2, is a cross-head, which derives its forward motion from the knuckle $n$ on shaft B, fig. 3, coming in contact with a section of the cross-head, seen at $j$, and is intended to force the nut out of the die-box after it has been pressed and pierced.

L is a steel die or crowner, fastened to the cross-head H H, intended to work backward and forward in the die-box, and against the end of which the nut-blank is pressed and shaped, as seen in fig. 3.

N is a slide, working in grooves in the cross-head H H, but independently of it, and both this slide and the crowner L are bored out from end to end to receive the piercer S, fig. 2, the position of which is represented by the dotted lines g g.

The slide N is moved by the knuckle v on shaft B, coming in contact with the tongue x, which tongue is fastened to the under side of slide N, and is intended to move the piercer S forward, to pierce the nut-blank after it has been forced into the die-box and compressed.

Both the slide N and cross-head H H are drawn back to their proper positions by the springs e y e, fig. 5, after piercing the nut-blank, and forcing the nut out of the die-box.

S is a round steel punch or piercer, held in its place by the set-screws t t, and capable of being moved forward by the screw J, fig. 3.

I I is the die-block, intended for holding the dies A', figs. 6 and 7. These dies are made so as to form a square or hexagonal box, as required for making square or hexagonal nuts, as represented in the figures.

P and W, fig. 3, are levers, of cast iron, made very strong, to sustain the pressure given the nut-blank while in the die-box, having contact at r with a section of the cross-head H H, substantially as represented.

k is a weight, upon the lever P, which can be shifted to any point desirable, like the weight upon a steel-yard, for the purpose of increasing or diminishing the pressure upon the nut or washer.

By means of the hand-wheel T, fig. 4, the lever P can be raised or lowered, and the cross-head H H, fig. 2, carrying the crowner L, moved forward or backward in the die-box, so as to produce a greater or less pressure upon the nut, without altering the position of the cut-off punch D.

R, fig. 3, is the nut-blank, after it has been severed from the heated bar, and forced into the die-box, and about to be pressed or pierced.

It will be seen that the dies A', figs. 6 and 7, when placed in the die-block I I, fig. 2, are stationary dies.

The shank of the crowner L has a thread cut on it, and is screwed into a round socket or holder, which socket also has a round shank to fit in the cross-head H H, as represented by dotted lines in fig. 2, and is held firmly in its position by a nut, seen at S, fig. 2, and when thus fastened, the crowner L is rigidly and securely held to the cross-head H H.

When desirable to remove the crowner from the die-box, for the purpose of dressing up the end subject to wear from the pressure of the hot iron, all that is necessary to be done is to turn the socket or crowner-holder around in its position, which will unscrew the crowner, and run it out of the die-box in front, thus obviating any necessity of removing the die-plates, punches, binders, or gauges, and thereby saving much time otherwise lost in taking out the die-plates, punches, &c., and readjusting the machine.

Having thus described the several parts of the machine, it remains to describe its operation.

A bar of wrought iron is heated to whiteness, so as to be soft and easily worked, and the heated end introduced at z, fig. 1, when the cut-off punch D moves forward and severs a blank nut from the end of the bar, and forces it into the die-box, where its sides are firmly supported by the sides of the dies, and when fully within the die-box, it comes in contact with the end of the steel crowner L, fig. 3, when it begins to sustain pressure between the crowner and cut-off punch D, while the crowner L is firmly held in position by the cross-head H H, which is likewise supported at r, fig. 3, by the pressure of the levers W P. As the nut-blank R, fig. 3, is forced still farther into the die-box by the punch D reaching its extreme point within the dies, the nut-blank is subjected to severe compression between the crowner L and cut-off punch D, and just at this point the piercer S is moved forward, by the knuckle v coming in contact with the steel-faced tongue x, piercing the nut, and forcing the core, or piercing into the cut-off punch D, when the knuckle n on shaft B comes in contact with the section of the cross-head H H at j, as the shaft B turns round, and the cross-head is moved forward, forcing the nut out of the die-box as the cut-off punch D recedes, and the nut falls under the machine in an iron bucket. The piercing or core of the nut which is thus forced into the cut-off punch D, lies there until the cross-head C C is drawn back, when the end of the pusher p comes in contact with the stationary stud h, and pushes the piercing out of the punch D at the same end it went in, and it falls under the machine in the same bucket with the nut. After the knuckle v has slipped the tongue x, which does not happen till the nut has been pierced, the spring y, fig. 5, draws the piercer-slide N back to its position. So, also, is the cross-head H H drawn back by the springs e e, fig. 5, after the nut has been forced out of the die-box, and the machine then assumes its original position.

All of these operations occur during one revolution of the shafts M and B, and these shafts may have a speed of forty to sixty revolutions per minute, according to the facility with which the workman feeds his iron. A nut may be made at each revolution, although practically this is not always accomplished.

It will readily be perceived that the nut-blank R, fig. 3, is stationary while being pierced, having its sides supported by the sides of the die-box, to prevent any fracture of the iron, and that the piercer S moves with a quick motion on a line with the hole in the cut-off punch D, drawing out from the nut as soon as it has fairly pierced it, to avoid heating the end of the piercer by long contact with the heated iron.

It will be seen also that the crowner L is moved forward by the cross-head H H, fig. 2, in the same parallel line with the sides of the die-box, thus preventing any tendency to bind or cut fast in the dies, or other derangement. The cross-heads C C and H H also move in parallel lines.

But one of the most valuable and practical improvements will be found in connection with the levers W and P, fig. 3, whereby iron of unusual thickness may be used, without danger of breaking the machine, or even if by accident two nuts are forced into the die-box at the same time, a circumstance which may often happen, there will still be no danger of breaking the machine, because the top of the lever W will be forced back, thus depressing the lever P at q, when the pressure in the die-box is sufficient to overcome the inertia of the weight $k$, and the lever P will be lifted up, as shown by the dotted lines, and thus room will be made in the die-box for the two nuts.

There is still a further advantage derived from the combination and arrangement of these levers W and P, by which the workman can produce any given pressure upon the nut desirable, so as to secure uniformity and perfection of finish to every nut, by simply raising or lowering the lever P, thus throwing the crowner L farther backward or forward in the die-box, and diminishing or increasing the pressure upon the nut-blank, as may be desired. This is important, as it enables the workman to produce a perfect article, without loss of time in readjusting the cut-off punch D, and also without danger of breaking the machine.

In case thin nuts or washers are to be made, then the crowner L will be thrown forward in the die-box, by means of the levers, as before described, so that the nut or washer need only enter the die-box, when it will be pressed and shaped against the crowner L, then pierced and forced out again. This is an important advantage over other machines, as it is found objectionable to press thin nuts so far within the die-box as may be necessary for thick nuts.

What I claim as my invention, and desire to secure by Letters Patent, is—

1. The combination of the weighted lever (or levers) P W, with cross-head H H, crowner L, and cam $n$ on shaft B, for the purpose of throwing the finished nut or washer out of the die-box at the time and in the manner specified.

2. The combination of the crowner L, with weighted lever P W and gauge T, for the purpose of graduating the space in the die-box between the punch D and crowner L to different thicknesses of iron, without unnecessary waste of time, substantially as described.

J. H. STERNBERGH.

Witnesses:
ALLEN KRITZ,
E. W. EARL.